United States Patent
Olson et al.

(10) Patent No.: US 9,327,921 B1
(45) Date of Patent: May 3, 2016

(54) FLOATING DIRECT DRIVE SWEEP ASSEMBLY

(71) Applicant: SUKUP MANUFACTURING CO., Sheffield, IA (US)

(72) Inventors: Ryan T. Olson, Dows, IA (US); Randal L. Marcks, St. Ansgar, IA (US)

(73) Assignee: Sukup Manufacturing Co., Sheffield, IA (US)

( * ) Notice: Subject to any disclaimer, the term of this patent is extended or adjusted under 35 U.S.C. 154(b) by 0 days.

(21) Appl. No.: 14/519,207

(22) Filed: Oct. 21, 2014

(51) Int. Cl.
*B65G 65/46* (2006.01)
*B65G 33/10* (2006.01)

(52) U.S. Cl.
CPC .............. *B65G 65/466* (2013.01); *B65G 33/10* (2013.01); *B65G 2201/042* (2013.01)

(58) Field of Classification Search
CPC ........ B65G 33/10; B65G 33/34; B65G 65/44; B65G 65/466
USPC .......... 198/677, 674, 658, 670; 414/310, 311, 414/312, 326
See application file for complete search history.

(56) References Cited

U.S. PATENT DOCUMENTS

| | | | | |
|---|---|---|---|---|
| 3,064,831 A | * | 11/1962 | Cook | A01F 25/2018 222/236 |
| 3,076,567 A | * | 2/1963 | O'Dell | B65G 65/466 414/310 |
| 4,451,192 A | * | 5/1984 | Wood | B65G 65/466 198/550.4 |
| 5,221,049 A | * | 6/1993 | Linde | A01C 3/063 198/311 |
| 6,095,742 A | * | 8/2000 | Campbell | B65G 65/466 198/493 |
| 6,203,261 B1 | * | 3/2001 | South | B65G 65/466 198/511 |
| 6,254,329 B1 | * | 7/2001 | Sukup | B65G 65/466 414/310 |
| 6,948,902 B2 | | 9/2005 | Hanig | |
| 7,025,555 B2 | | 4/2006 | Hanig | |
| 8,616,823 B1 | * | 12/2013 | Hoogestraat | B65G 65/466 414/310 |
| 9,073,700 B2 | * | 7/2015 | Kerschbaumer | |

OTHER PUBLICATIONS

"GSI: X-Series Sweep," Jan. 2012, pp. 1-4, GS-058 Rev. 2, GSI Group, Inc.
"Sweep Augers DNS & BM Sweeping Brush," Feb. 2010, pp. 1-6, Denis.
Sudenga Industries, Inc., D150 Commercial Sweep Augers, Jun. 2012, pp. 1-2, Sudenga Industries, Inc.

* cited by examiner

*Primary Examiner* — Leslie A Nicholson, III
*Assistant Examiner* — Keith R Campbell
(74) *Attorney, Agent, or Firm* — Zarley Law Firm, P.L.C.

(57) ABSTRACT

A sweep assembly having a drive system connected to a sweep auger and a backboard. The backboard is connected to support members that are also connected to a mounting plate. The mounting plate has flanges that are connected to pins. The pins are received in elongated slots that are part of a central pivot section.

7 Claims, 3 Drawing Sheets

FLOATING DIRECT DRIVE SWEEP ASSEMBLY

BACKGROUND OF THE INVENTION

This invention is directed toward a sweep assembly and more particularly to a floating direct drive sweep assembly.

Current sweep assemblies are either fixed vertically to a central pivot or use a knuckle or u-joint to allow the sweep to float independently of a drive unit. Stresses result with systems that are fixed vertically due to uneven spots in the floor. Current floating designs require additional parts in the form of a knuckle to transfer power from the drive to the sweep. Thus, a need exists in the art for a device that addresses these deficiencies.

Therefore, an objective of the present invention is to provide a sweep assembly that permits a drive unit to be directly connected to a sweep auger without undue stress.

Another object of this invention is to provide a floating sweep auger having fewer parts.

These and other objectives will be apparent to those of ordinary skill in the art based upon the following written description, drawings, and claims.

BRIEF SUMMARY OF THE INVENTION

A sweep assembly having a drive system connected to a sweep auger and a backboard. The backboard is connected to support members that are also connected to a mounting plate. The mounting plate has flanges that are connected to pins. The pins are received in elongated slots that are part of a central pivot section.

DETAILED DESCRIPTION OF THE PREFERRED EMBODIMENT

Figure 1:
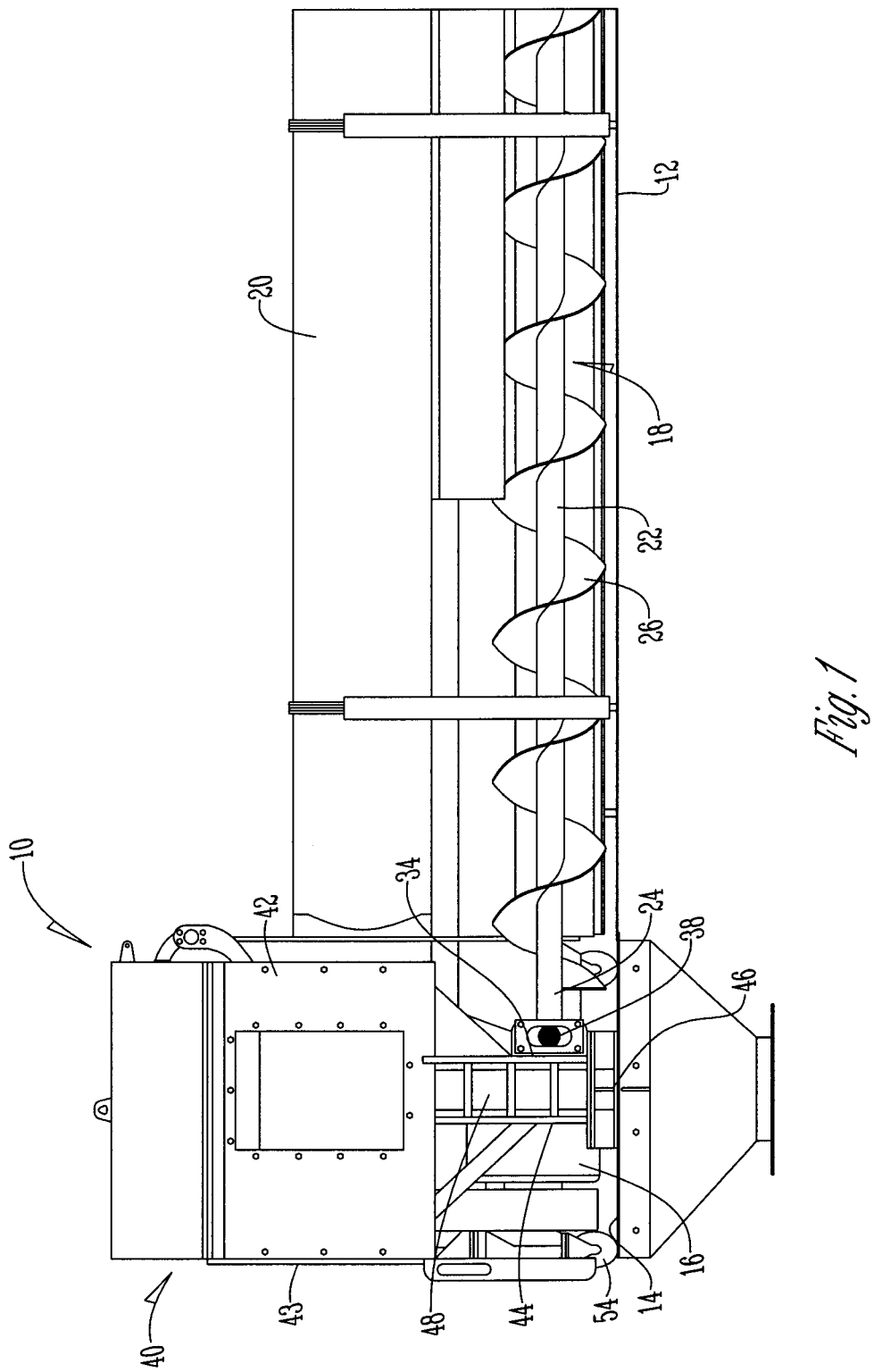
FIG. 1 is a partial side view of a sweep assembly.
Figure 2:
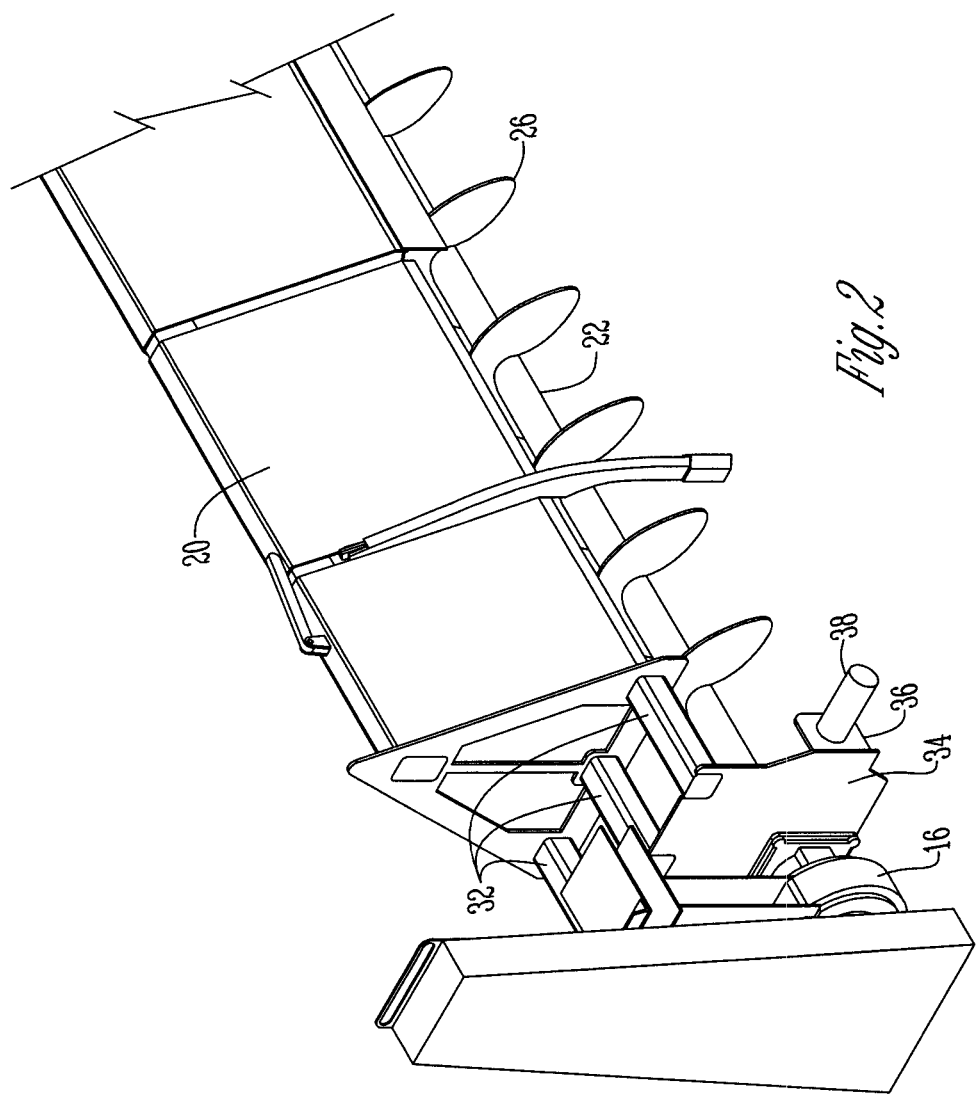
FIG. 2 is a partial perspective view of a sweep assembly.
Figure 3:
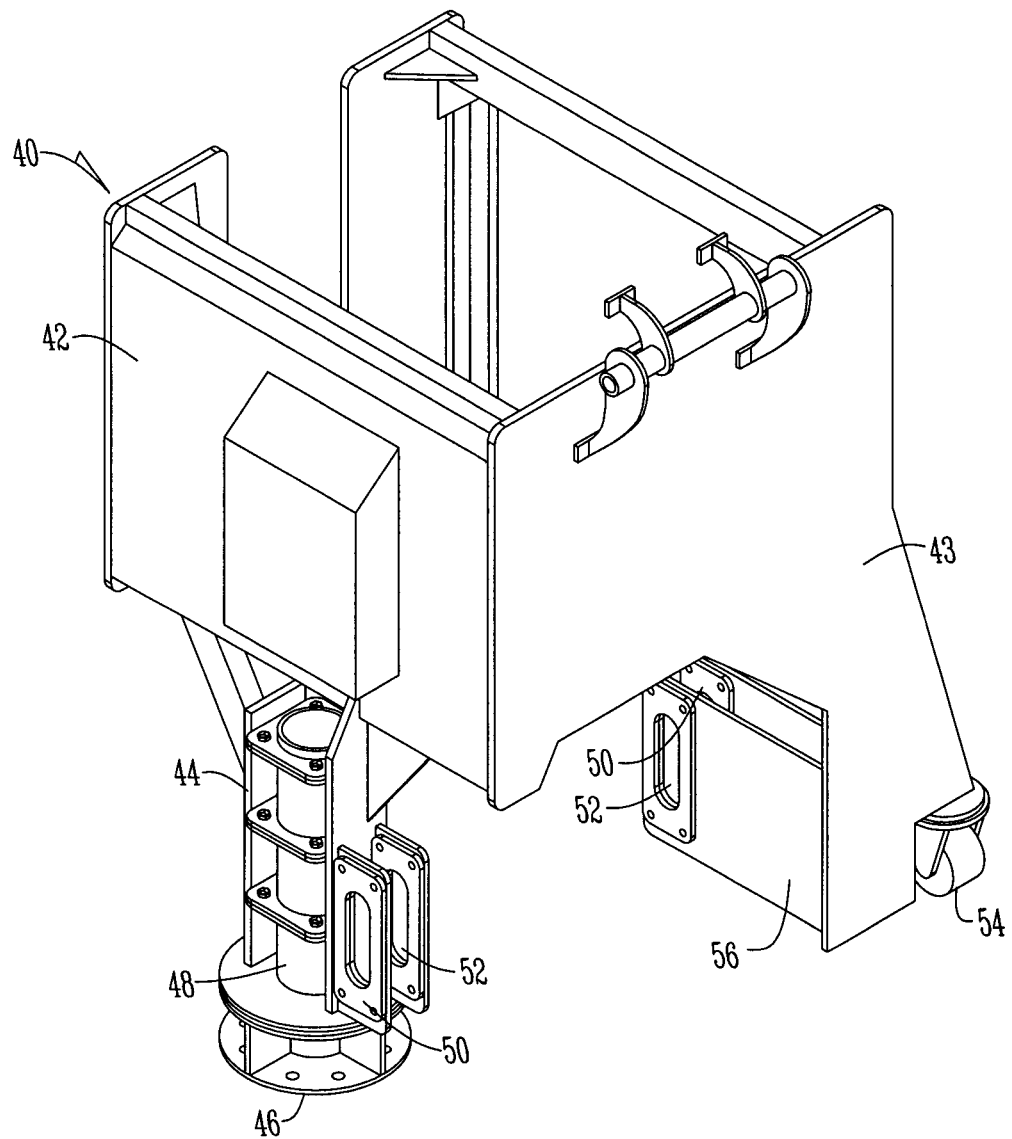
FIG. 3 is a perspective view of a pivoting center section.

Referring to the figures a floating direct drive sweep assembly 10 is assembled and used in relation to a circular grain storage bin having a vertical and generally cylindrical sidewall and a circular floor 12 having a centrally located sump opening 14.

The sweep assembly 10 includes a drive system 16 that is directly connected to a sweep auger 18 and a backboard 20. The drive system 16 includes a gear box and motor assembly (not shown) that are connected to a drive shaft 22 of the auger 18 at a first end 24 for rotating the auger 18 about its longitudinal axis. Extending along a trailing edge of the auger 18 is the backboard 20.

The backboard has three support members 32 that extend outwardly toward the drive system 16 in generally parallel spaced relation to the floor 12. The support members 32 are connected to a generally vertical mounting plate 34. The mounting plate 34 has an opening (not shown) through which the drive shaft 22 is connected to the drive system 16.

The mounting plate has a pair of perpendicular flanges 36 that each receive a concentric pin 38. The concentric pin 38 is positioned generally parallel to the floor 12 and perpendicular to the longitudinal axis of the auger 18. The pins 38 are connected to a center section housing 40 to shield the drive system 16 from grain.

The center section housing 40 has side walls 42 and 43. One side wall 42 is supported by a bracket 44 that is supported by a pivot plate 46 and surrounds a vertical shaft 48 that extends through the plate 46 and the sump opening 14. The bracket 44 rotates about the vertical shaft 48 connected to the bracket are a pair of spaced flanges 50 having aligned elongated slots 52. Another side wall 43 extends downwardly to partially cover the drive system 16. This side wall 43 is supported by a rotatable wheel assembly 54. Extending away from wheel 54 are a pair of support flanges 56 that have elongated slots that are in horizontal alignment with slots 52. Slots 52 receive pins 38. The elongated or elliptical shape of the slots 52 allow the pins 38 as well as the drive system 16, sweep auger 18, and backboard 20 to float up and down in a vertical direction as the sweep auger 18 encounters uneven areas of the floor 12. This in turn reduces stress on the connection between the drive system 16, sweep auger 18, and backboard 20 as well as wear and damage.

Thus, a floating direct drive sweep assembly has been disclosed that at the very least meets all the stated objectives.

What is claimed:

1. A sweep assembly, comprising:
a drive system connected to a sweep auger and a backboard wherein the drive system is connected to the sweep auger through a mounting plate having flanges;
support members connected to the backboard and the mounting plate;
at least one pin attached to each flange of the mounting plate and received in elongated slots on a rotating center section.

2. The assembly of claim 1 wherein the center section has a sidewall that partially covers the drive system.

3. The assembly of claim 1 wherein the center section is supported by a bracket attached to a pivot plate.

4. The assembly of claim 3 wherein a pair of spaced flanges having aligned slots are connected to the bracket.

5. The assembly of claim 2 wherein the sidewall is supported by a rotatable wheel assembly.

6. The assembly of claim 5 wherein a pair of spaced flanges having aligned slots extend away from the wheel assembly.

7. The assembly of claim 1 wherein the at least one pin is parallel to a floor and perpendicular to the auger.

* * * * *